July 1, 1941.  H. NUTT  2,247,690
FRICTION CLUTCH PLATE
Filed April 21, 1939
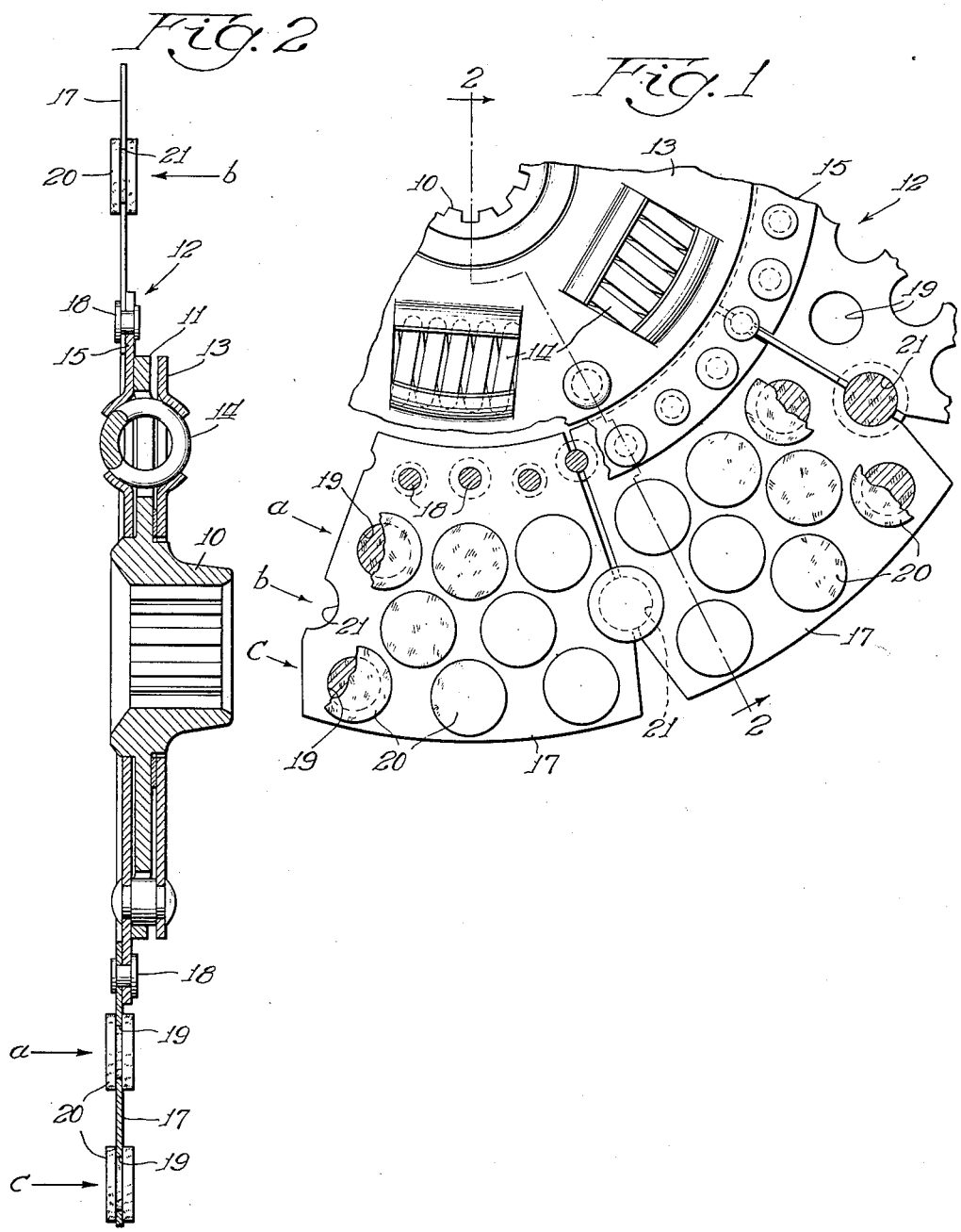
Inventor:
Harold Nutt
By: Edward C. Gritzbaugh
Atty.

Patented July 1, 1941

2,247,690

UNITED STATES PATENT OFFICE 2,247,690

FRICTION CLUTCH PLATE

Harold Nutt, Chicago, Ill., assignor to Borg-Warner Corporation, Chicago, Ill., a corporation of Illinois Application April 21, 1939, Serial No. 269,109

1 Claim. (Cl. 192—107)

This invention relates to what is commonly called the driven plate of a friction clutch, and has as its primary object to provide a driven plate having a much lower spinning inertia than prior driven plates, having ample flexibility to conform to the surfaces of the driving members between which it is engaged, and yet having an unusually high load-carrying capacity.

Briefly, the invention accomplishes these purposes by providing a mounting disc for the facing elements, which instead of being a single disc of uniform thickness as in prior clutch plates, is composed of a central disc which is of relatively heavy material so as to withstand the concentration of torque load toward the axis of the plate, and providing the outer region of the mounting disc in the form of a plurality of independent segments of light thin spring sheet metal riveted to the periphery of the heavy central portion of the disc.

Another object of the invention is to provide a driven plate of the cork insert type, having a minimum spinning inertia, having the cork mounting members in the form of a plurality of relatively thin independent segments, and yet having a uniform distribution of the cork inserts.

This construction eliminates most of the waste in blanking the peripheral portion of the plate, as the segments can be nested in the sheet of stock from which they are blanked.

The invention, in a preferred form, is illustrated in the accompanying drawing and hereinafter fully described.

Fig. 1 is an elevation of a driven plate embodying my invention, parts being broken away and other parts being shown in section, so as to more clearly illustrate the construction thereof;

Fig. 2 is a radial sectional view thereof taken as indicated by the line 2—2 of Fig. 1.

The clutch includes the conventional hub 10, adapted to be secured to a driven shaft, and having a radially outwardly projecting annular flange 11 on which is mounted the facing carrying disc indicated generally at 12. The disc 12, together with a ring 13, may be associated with the flange 11 through the medium of cushioning springs 14 so as to provide a conventional torsional dampener connection between the hub and the mounting disc 12.

The mounting disc 12, instead of comprising a single disc of heavy material extending the full diameter of the driven plate as in prior constructions, comprises a central disc portion 15 which is of conventionally heavy sheet metal but has a minimum diameter, terminating just short of the area occupied by the facing corks 16. The remainder of the mounting disc 12 is composed of a plurality of segments 17 of relatively thin sheet spring material, secured to the periphery of the disc portion 15 by means of rivets 18.

It is to be understood that the invention is not intended to be limited to the use of rivets in securing the segments to the inner disc member. For example, the segments might be secured by welding.

The segments 17 are perforated to provide a series of equidistantly spaced openings 19, in which facing corks 20 are inserted in a conventional manner, as by feeding the corks through a tube having an internal diameter the same as the openings 19, in which tube the corks will be compressed until they are expelled into the openings 19.

In order to secure uniform spacing of the corks, they are mounted in concentric annular rows $a$, $b$ and $c$, the inner and outer rows $a$ and $c$ each being arranged to include a set of three openings 19 in each of the segments 17, the remote openings of each of these sets of three openings being spaced fairly close to the radial edges of the segments, and the row $b$ comprising a pair of openings 19 which are positioned circumferentially intermediate the openings of the rows $a$ and $c$. One additional cork is accommodated in the row $b$, in an opening 21 half of which is formed in an edge of one segment 17 and the other half of which is formed in the adjacent edge of an adjacent segment.

The rows $a$, $b$ and $c$ of facing corks occupy an annular area lying just beyond the periphery of the inner disc portion 15 of the mounting plate, the only metal in said area being the thin light mounting segments 17. In a plate having substantially the proportions shown in the drawing, the spinning inertia will be reduced to only about one-third of what it would be if the mounting disc were continued full thickness to the full diameter of the plate.

At the same time, the ability of the plate to withstand torsional loads, is more than ample for the heaviest industrial uses such as for example, in motor trucks.

By forming the peripheral portion of the mounting disc in the form of individual segments, several advantages are gained. Much less material is required than would be needed for forming a continuous ring. It becomes possible to cyanide the central disc portion 15 without cyaniding the full diameter disc. To cyanide the thin peripheral portion of the disc in the event a continuous ring were employed, would cause distortion of the disc to such an extent that it would not be usable for its intended purpose. Furthermore, such a cyaniding operation would be very expensive if the disc were held in a fixture during the heat treatment in order to avoid warpage.

The driven plate of this invention is adaptable for use in manual or automatic clutches wherein the driven disc must be subjected to an oil bath. The oil is quickly squeezed from the faces of the corks 20, and discharged by centrifugal action through the passages between the corks. The independent segmental construction makes the plates more flexible in conforming to the surfaces of the driving members between which it is engaged, than has been attained in any prior driven plate. This arises from the fact that the facing material on one segment is entirely disconnected from the facing material on the adjacent segment.

In addition, the segmental construction reduces the tendency of the mounting plate to distort under the effect of heat developed in the operation of the clutch.

Although I have shown a full set of rivets securing each cushion 17 to the mounting plate, it is contemplated that alternate rivet holes (including the segmental holes formed between adjacent segments) will be left open for balancing purposes, and rivets inserted in only enough of such alternate openings to properly balance the plate.

I claim:

In a friction clutch driven plate, a hub, a facing mounting disc carried thereby, said mounting disc being of relatively heavy non-yieldable sheet metal, a plurality of thin yieldable cushioning segments occupying an annular region lying beyond the outer radial limits of said mounting disc, attached to said mounting disc at their inner ends, adjacent segments having their radial edges lying closely adjacent each other throughout the major portion of their radial extent, and friction facings independently carried by said segments, said segments having a substantially lesser weight per unit area than that of said mounting member, whereby to minimize rotational inertia, the facings of each segment comprising a series of uniformly spaced corks arranged in radially spaced rows, the adjacent edges of adjacent sectors being indented to form openings in which some of said corks are mounted.

HAROLD NUTT.